United States Patent
Akiyama et al.

(10) Patent No.: US 6,775,610 B2
(45) Date of Patent: Aug. 10, 2004

(54) ENGINE TESTING SYSTEM USING SPEED CONTROLLER DESIGNED BY M$\mu$ SYNTHESIS METHOD

(75) Inventors: Takao Akiyama, Tokyo (JP); Masayasu Kanke, Saitama (JP)

(73) Assignee: Kabushiki Kaisha Meidensha, Tokyo (JP)

( * ) Notice: Subject to any disclaimer, the term of this patent is extended or adjusted under 35 U.S.C. 154(b) by 117 days.

(21) Appl. No.: 10/268,079

(22) Filed: Oct. 10, 2002

(65) Prior Publication Data

US 2003/0083793 A1 May 1, 2003

(30) Foreign Application Priority Data

Oct. 11, 2001 (JP) ...................................... 2001-313395

(51) Int. Cl.[7] .............................................. G01M 15/00
(52) U.S. Cl. .......................... 701/114; 701/110; 701/54; 73/117.3
(58) Field of Search ........................... 701/114, 29, 110, 701/35, 53, 54, 115; 73/117.3, 116

(56) References Cited

U.S. PATENT DOCUMENTS

| | | | |
|---|---|---|---|
| 4,680,959 A | * | 7/1987 | Henry et al. .................. 73/117 |
| 4,995,139 A | * | 2/1991 | Suzuki .......................... 73/116 |
| 5,078,008 A | * | 1/1992 | Yagi et al. ..................... 73/117 |
| 6,434,454 B1 | | 8/2002 | Suzuki |

FOREIGN PATENT DOCUMENTS

| | | | | | |
|---|---|---|---|---|---|
| JP | 6-174597 A | * | 6/1994 | .......... | G01M/15/00 |
| JP | 7-333108 A | * | 12/1995 | .......... | G01M/15/00 |
| JP | 2003-121308 A | * | 4/2003 | .......... | G01M/15/00 |

* cited by examiner

*Primary Examiner*—Hieu T. Vo
(74) *Attorney, Agent, or Firm*—Foley & Lardner LLP

(57) ABSTRACT

An engine testing system has a speed control system which controls at least one of an engine speed and a dynamo speed. The control system comprises a mechanical transfer function which receives an engine torque and a dynamo torque and outputs an engine speed, the axial torque and a dynamo speed, an electric transfer function which receives a command dynamo torque and outputs the dynamo torque, and a speed controller which receives one of a command engine speed and a command dynamo speed and at least one of the engine speed and the dynamo speed, and outputs the command dynamo torque. A transfer function representative of the speed controller is designed using the structured singular value synthesis method so as to be adapted to the mechanical transfer function and the electric transfer function.

16 Claims, 9 Drawing Sheets

ENGINE TESTING SYSTEM USING SPEED CONTROLLER DESIGNED BY Mμ SYNTHESIS METHOD

BACKGROUND OF THE INVENTION

The present invention relates to a system and method of measuring characteristics of an engine, and more particularly to an engine testing system (so-called engine bench system) for measuring various characteristics of an engine by directly connecting the engine with a dynamometer functioning as a driving power absorber and to a method of measuring the engine characteristics.

Generally, an engine testing system is constructed by connecting a dynamometer with a combination of an engine and a transmission. The control of the engine is executed by controlling a throttle opening of the engine, and the control of the dynamometer is executed by controlling a speed and a torque on the basis of detection signals detected by a speed detector and a torque detector provided in the dynamometer. This control is executed by PID control (Proportional, Integral and Derivative Control) using a controller.

SUMMARY OF THE INVENTION

However, such an engine testing system using the PID control has a possibility that the shaft connecting the dynamometer and the engine may cause resonance vibration due to a pulsation torque generated by the engine. Therefore, it is necessary to execute the PID control of the dynamometer within an engine operation range where a frequency of a pulsation vibration generated by the engine is smaller than a resonance frequency of a mechanical system of the dynamometer, the shaft, and the engine. Therefore, it is difficult to execute a high-responsibility speed control under this limitation due to the resonance frequency of the mechanical system.

Although it is possible to construct the mechanical system using a high rigidity shaft so that the resonance frequency of the mechanical system becomes out of an operation range of the engine, a speed control using the PID control has a limitation that uncertain factors such as an engine pulsation torque affects the control response of the speed control.

It is therefore an object of the present invention to provide a system and method which is capable of stably measuring engine characteristics in high speed by constructing a speed control system of the system via the structured-singular-value synthesis method.

An aspect of the present invention resides in a system for measuring characteristics of an engine. The system is constructed by connecting the engine with a dynamometer functioning as a driving force receiving member by means of a shaft. The system comprises a speed control system which controls at least one of an engine speed and a dynamo speed. The speed control system comprises a first block represented by a mechanical transfer function, a second block represented by an electric transfer function, and a speed controller. The first block receives an engine torque and a dynamo torque and outputs the engine speed, an axial torque and the dynamo speed. The second block receives a command dynamo torque and outputs the dynamo torque. The speed controller receives one of a command engine speed and a command dynamo speed, and at least one of the engine speed and the dynamo speed, and outputs the command dynamo torque. The speed controller is represented by a transfer function designed using the structured singular value synthesis method so as to be adapted to the mechanical transfer function and the electric transfer function.

Another aspect of the present invention resides in a method for measuring characteristics of an engine using a speed control system for controlling at least one of an engine speed and a dynamo speed in a system of the engine, the dynamometer, and the shaft. The method comprises the steps of: receiving an engine torque and a dynamo torque and outputting the engine speed, an axial torque and the dynamo speed in response to the engine torque and the dynamo torque; receiving a command dynamo torque and outputting the dynamo torque in response to the command dynamo toque; and receiving one of a command engine speed and a command dynamo speed, and at least one of the engine speed and the dynamo speed, and outputting the command dynamo torque in response to the received signals by means of a speed controller which is represented by a transfer function designed using the structured singular value synthesis method so as to be adapted to the mechanical transfer function and the electric transfer function.

The other objects and features of this invention will become understood from the following description with reference to the accompanying drawings.

DETAILED DESCRIPTION OF THE INVENTION

Figure 1:
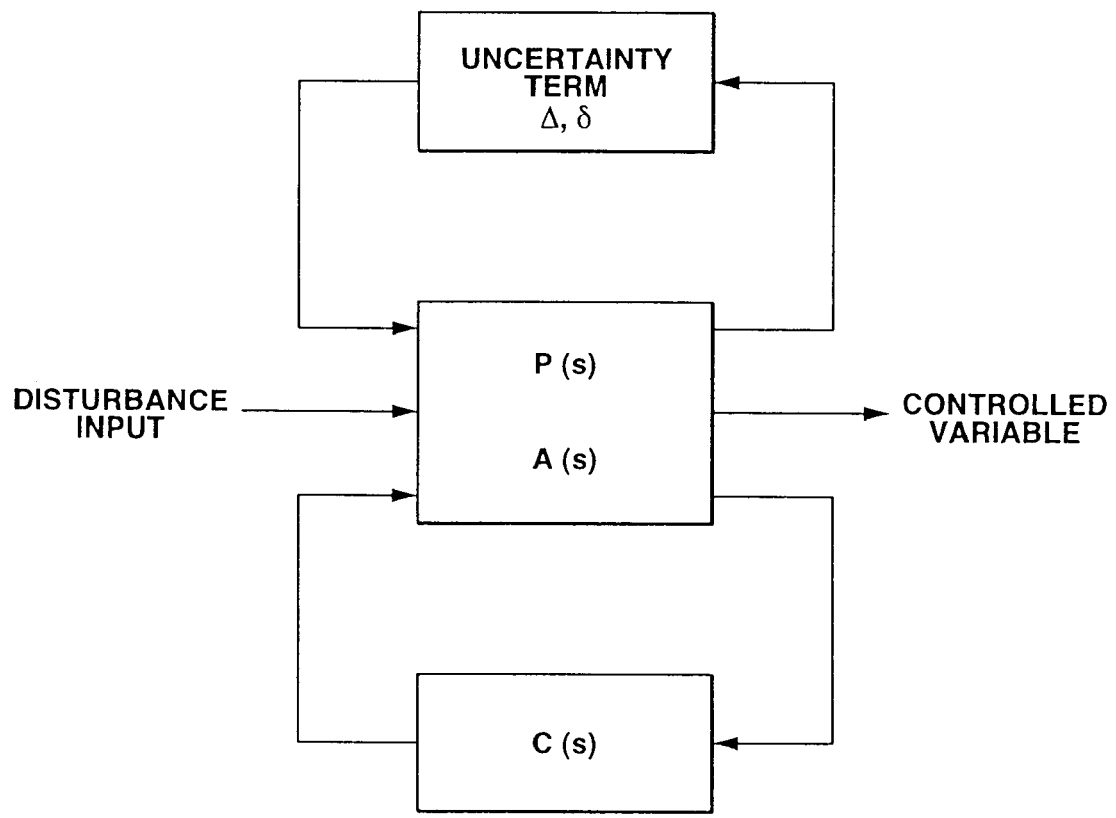
FIG. 1 is a block diagram showing a basic concept employed in an engine testing system and a method for measuring engine characteristics using the system according to the present invention.
Figure 2A:
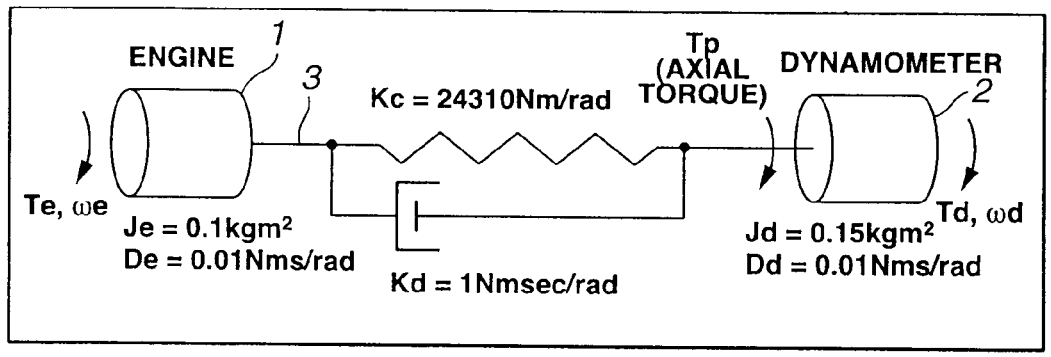
FIG. 2A is a view showing a modeled vibration system dynamic characteristic of a torque transfer system in a mechanical system of the engine testing system.
Figure 2B:
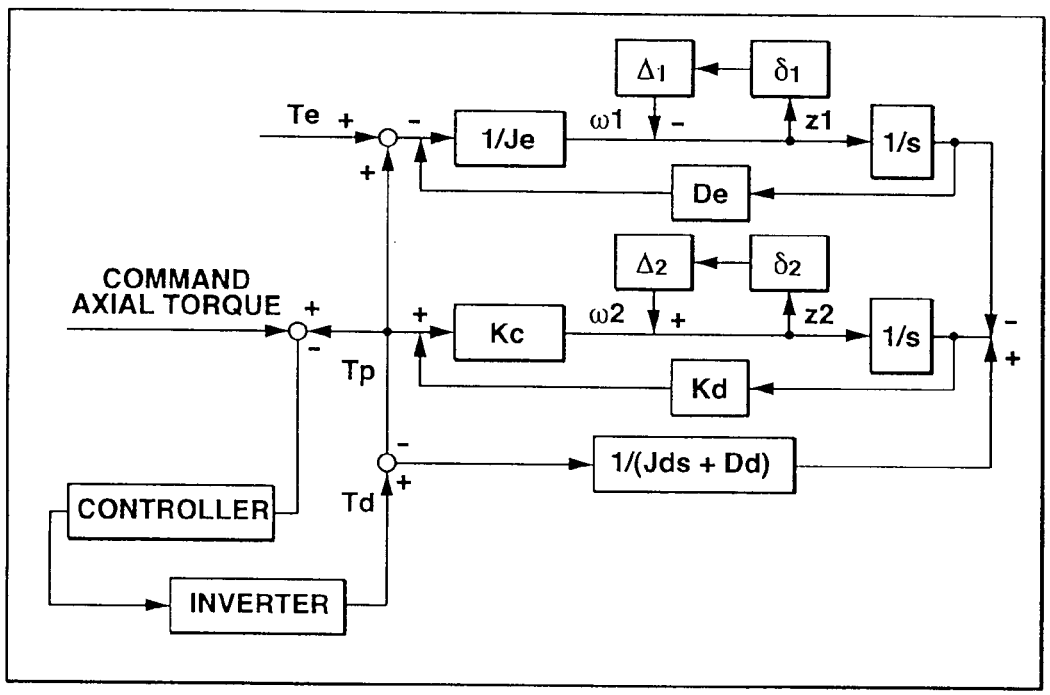
FIG. 2B is a block diagram showing an equivalent circuit of a transfer function of the modeled vibration system dynamic characteristic.

Referring to FIGS. 1 through 2B, there is shown a fundamental theory adapted to embodiments of a system and method of measuring characteristics of an engine in accordance with the present invention. A speed control system of the system (engine testing system) of measuring the characteristics of the engine is constructed by means of the structured-singular-value synthesis method ($\mu$-synthesis method) wherein a disturbance input, a controlled variable and an uncertainty terms are employed as shown in FIGS. 1, 2A and 2B. It is known that the $\mu$-synthesis method is capable of representing a magnitude of each uncertainty (perturbation) of an actual system using a structured singular value $\mu$. Accordingly, it is possible to obtain the magnitude of each uncertainty so as to achieve the robust stability and the robust performance of the system, and to design the transfer function of a speed controller in the speed control using the structured singular value $\mu$.

FIG. 1 is a basic block diagram showing the fundamental theory employed in the engine testing system (engine benchtest system) according to the present invention. In FIG. 1, P(s) is a mechanical transfer function from an engine torque and a dynamo torque to an engine speed, an axial torque, and a dynamo speed. A(s) is an electric transfer function from a command dynamo torque to the dynamo torque. C(s) is a transfer function of a controller designed by the $\mu$-synthesis method. $\Delta$ and $\delta$ are uncertainty terms. These references P(s), A(s), C(s), $\Delta$ and $\delta$ are commonly employed in the whole embodiments discussed later.

A mechanical system of the engine testing system is constituted by a supplied engine 1, a dynamometer 2 and a shaft 3 connecting the engine 1 and the dynamometer 2, and therefore an equivalent circuit of the mechanical system can be represented by FIGS. 2A and 2B. More specifically, FIG. 2A shows a modeled vibration-system dynamic characteristic of a torque transfer system in the mechanical system, and FIG. 2B shows an equivalent circuit of the transfer function in the model of FIG. 2A. In FIGS. 2A and 2B, Te is an engine torque, $\omega$e is an engine speed, Je is an inertia moment of the engine 1, De is a viscous friction coefficient of the engine 1, Kc is a spring coefficient of the shaft 3, Kd is a viscous friction coefficient of the shaft 3, Tp is an axial torque, Jd is an inertia moment of the dynamometer 2, Dd is a viscous friction coefficient of the dynamometer 2, Td is a torque of the dynamometer 2, $\omega$d is a rotation speed of the dynamometer 2, and $\delta_1$, $\delta_2$, $\Delta_1$, and $\Delta_2$ are uncertainties.

In the thus constructed engine testing system according to the present invention, the $\mu$-synthesis method adapted to the engine testing system employs a command speed, a command torque, and a speed detection noise of each of the engine 1 and the dynamometer 2, as a disturbance input, and further employs a speed difference between the engine 1 and the dynamometer 2, a command dynamo torque (a command value of a dynamo torque to the dynamometer 2) and an axial torque of the shaft 3, as a controlled variable for measuring engine characteristics. By constructing a speed control system using the $\mu$-synthesis method, the speed control system ensures a robust stability and a tightness assurance relative to the structured uncertainty.

Figure 3:
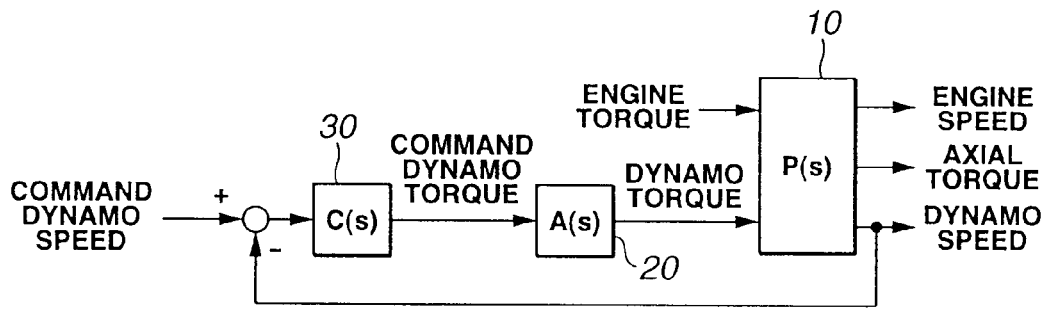
FIG. 3 is a block diagram showing a first embodiment of the system and method according to the present invention.

FIG. 3 shows a first embodiment of the engine testing system and a method employed therein according to the present invention.

In this first embodiment, the $\mu$-synthesis method is employed to derive a speed controller 30 in a one-degree-of-freedom speed control system for controlling the dynamo speed by detecting the dynamo speed. More specifically, a transfer function C(s) of the speed controller 30 is derived using the $\mu$-synthesis method wherein a command speed, a command torque, a speed detection noise of each of the engine 1 and the dynamometer 2 are appropriately employed as a disturbance input, and a speed deviation between the engine 1 and the dynamometer 2, a command dynamo torque (a command value of a dynamo torque to the dynamometer 2) and an axial torque are also appropriately employed as a controlled variable for measuring engine characteristics. Further, appropriate several factors in the mechanical system, such as an inertia moment of the engine 1, a spring constant of the shaft 3, an inertia moment of the dynamometer 2 are employed as an uncertainty term in the $\mu$-synthesis method for obtaining the transfer function C(s). Furthermore, if the mechanical system generates or receives an inertia moment except for that of the engine 1 or the dynamometer 2, such inertia moment may be employed as an uncertainty term in the $\mu$-synthesis method for obtaining the transfer function C(s).

The speed controller 30 represented by the transfer function C(s) receives a difference between the command dynamo speed and the dynamo speed outputted from a plant 10 and outputs the command dynamo torque to an inverter 20. The inverter 20 represented by a transfer function A(s) receives the command dynamo torque from the speed controller 30 and outputs the dynamo torque to the plant 10 which corresponds to the mechanical system of the engine testing system and which is represented by a transfer function P(s). In this engine testing system of the first embodiment, various engine characteristics are measured by detecting the axial torque.

Figure 4:
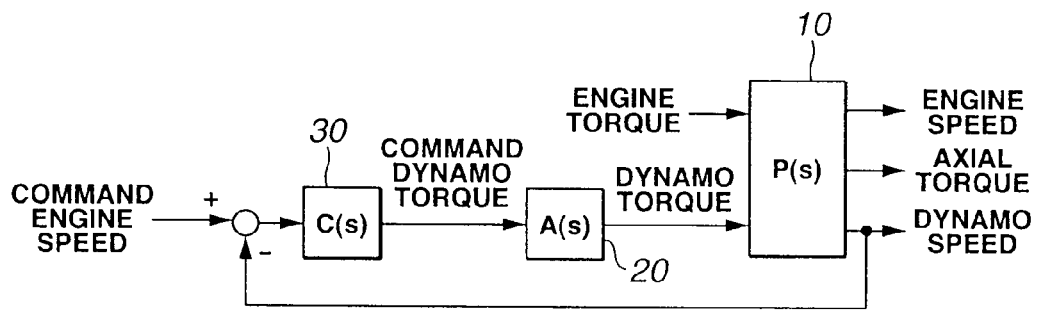
FIG. 4 is a block diagram showing a second embodiment of the system and method according to the present invention.

FIG. 4 shows a second embodiment of the engine testing system and the method employed therein according to the present invention.

In this second embodiment, the $\mu$-synthesis method is employed to derive a speed controller 30 in a one-degree-of-freedom speed control system for controlling the engine speed by detecting the dynamo speed. The transfer function C(s) of the speed controller 30 in this second embodiment is derived using the $\mu$-synthesis method wherein a disturbance input, a controlled variable and an uncertainty are appropriately employed as is basically similar to the first embodiment. The speed controller 30 receives a difference between the command engine speed and the dynamo speed and outputs the command dynamo torque. In this engine testing system of the second embodiment, various engine characteristics are measured by detecting the axial torque.

Figure 5:
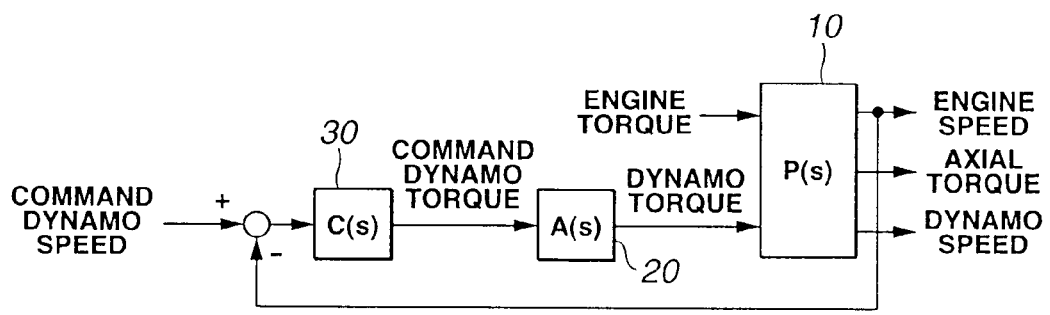
FIG. 5 is a block diagram showing a third embodiment of the system and method according to the present invention.

FIG. 5 shows a third embodiment of the engine testing system and the method employed in this system according to the present invention.

In this third embodiment, the $\mu$-synthesis method is employed to derive a speed controller 30 represented by a transfer function C(s) in a one-degree-of-freedom speed control system for controlling the dynamo speed by detecting the engine speed. The transfer function C(s) of the speed controller 30 in this third embodiment is derived using the µ-synthesis method wherein a disturbance input, a controlled variable and an uncertainty are appropriately employed as is basically similar to the first embodiment. The speed controller 30 receives a difference between the command dynamo speed and the engine speed and outputs the command dynamo torque. In this engine testing system of the third embodiment, various engine characteristics are measured by detecting the axial torque.

Figure 6:
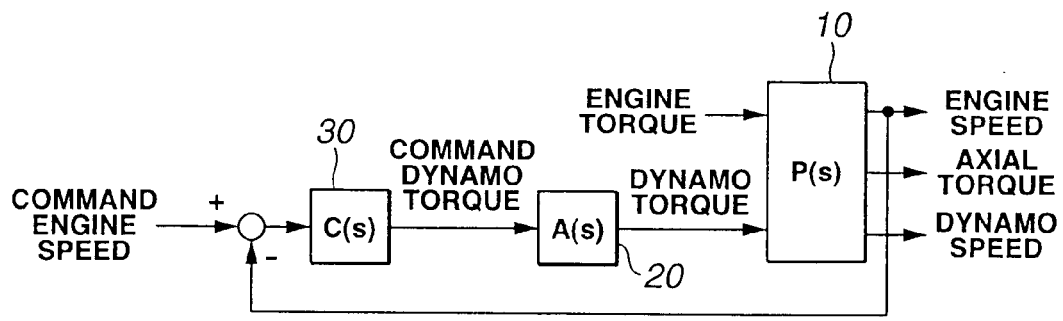
FIG. 6 is a block diagram showing a fourth embodiment of the system and method according to the present invention.

FIG. 6 shows a fourth embodiment of the engine testing system and the method employed in this system according to the present invention.

In this fourth embodiment, the µ-synthesis method is employed to derive a speed controller 30 represented by a transfer function C(s) in the one-degree-of-freedom speed control system for controlling the engine speed by detecting the engine speed. The transfer function C(s) of the speed controller 30 in this fourth embodiment is derived using the µ-synthesis method wherein a disturbance input, a controlled variable and an uncertainty are appropriately employed as is basically similar to the first embodiment. The speed controller 30 receives a difference between the command engine speed and the engine speed and outputs the command dynamo torque. In this engine testing system of the fourth embodiment, various engine characteristics are measured by detecting the axial torque.

Figure 7:
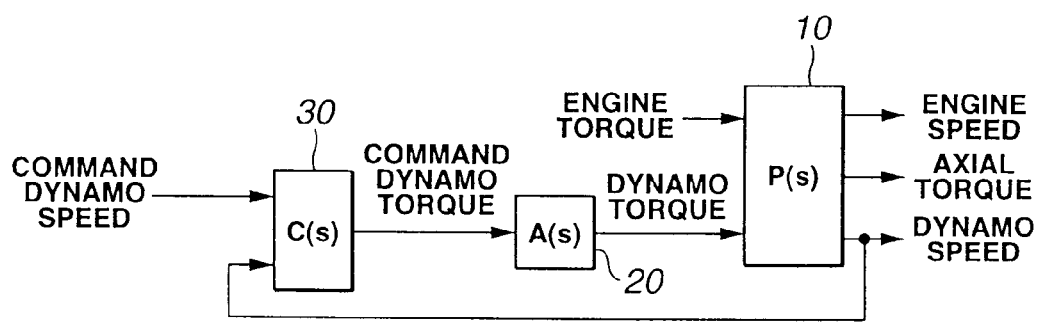
FIG. 7 is a block diagram showing a fifth embodiment of the system and method according to the present invention.

FIG. 7 shows a fifth embodiment of the engine testing system and the method employed in this testing system according to the present invention.

In this fifth embodiment, the µ-synthesis method is employed to derive a speed controller 30 represented by a transfer function C(s) in a two-degree-of-freedom speed control system for controlling the dynamo speed by detecting the dynamo speed. The transfer function C(s) of the speed controller 30 in this fifth embodiment is derived using the µ-synthesis method wherein a disturbance input, a controlled variable and an uncertainty are appropriately employed as is basically similar to the first embodiment. The speed controller 30 receives the command dynamo speed and the dynamo speed and outputs the command dynamo torque. In this engine testing system of the fifth embodiment, various engine characteristics are measured by detecting the axial torque.

Figure 8:
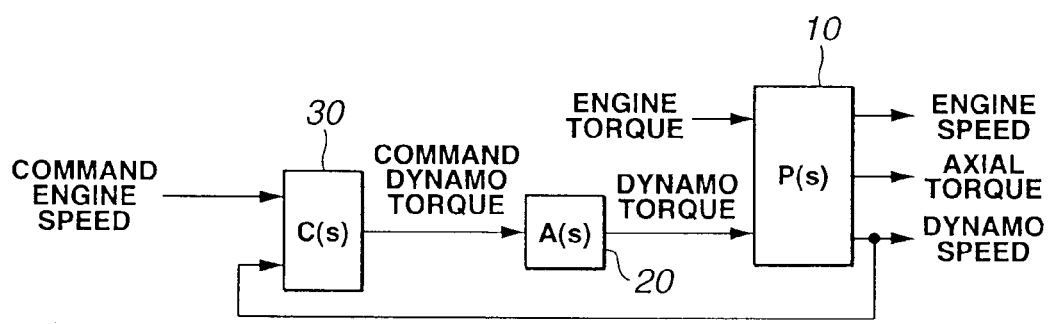
FIG. 8 is a block diagram showing a sixth embodiment of the system and method according to the present invention.

FIG. 8 shows a sixth embodiment of the engine testing system and the method employed in this system according to the present invention.

In this sixth embodiment, the µ-synthesis method is employed to derive a speed controller 30 represented by a transfer function C(s) in the two-degree-of-freedom speed control system for controlling the engine speed by detecting the dynamo speed. The transfer function C(s) of the speed controller 30 in this sixth embodiment is derived using the µ-synthesis method wherein a disturbance input, a controlled variable and an uncertainty are appropriately employed as is basically similar to the first embodiment. The speed controller 30 receives the command engine speed and the dynamo speed and outputs the command dynamo torque. In this engine testing system of the sixth embodiment, various engine characteristics are measured by detecting the axial torque.

Figure 9:
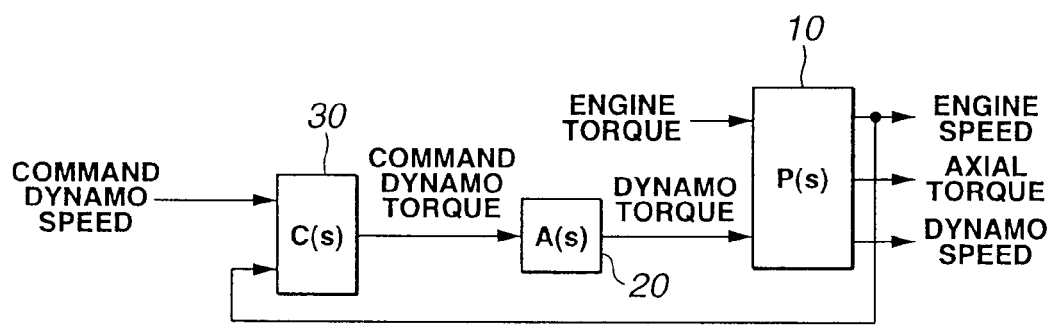
FIG. 9 is a block diagram showing a seventh embodiment of the system and method according to the present invention.

FIG. 9 shows a seventh embodiment of the engine testing system and the method employed in this system according to the present invention.

In this seventh embodiment, the µ-synthesis method is employed to derive a speed controller 30 represented by a transfer function C(s) in the two-degree-of-freedom speed control system for controlling the dynamo speed by detecting the engine speed. The transfer function C(s) of the speed controller 30 in this seventh embodiment is derived using the µ-synthesis method wherein a disturbance input, a controlled variable and an uncertainty are appropriately employed as is similar to the first embodiment. The speed controller 30 receives the command dynamo speed and the engine speed and outputs the command dynamo torque. In this engine testing system of the seventh embodiment, various engine characteristics are measured by detecting the axial torque.

Figure 10:
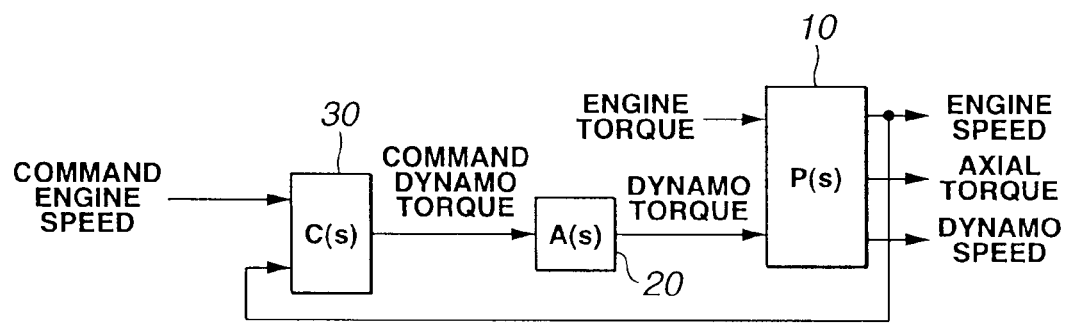
FIG. 10 is a block diagram showing an eighth embodiment of the system and method according to the present invention.

FIG. 10 shows an eighth embodiment of the engine testing system and the method employed in this system according to the present invention.

In this eighth embodiment, the µ-synthesis method is employed to derive a speed controller 30 represented by a transfer function C(s) in the two-degree-of-freedom speed control system for controlling the engine speed by detecting the engine speed. The transfer function C(s) of the speed controller 30 in this eighth embodiment is derived using the µ-synthesis method wherein a disturbance input, a controlled variable and an uncertainty are appropriately employed as is similar to the first embodiment. The speed controller 30 receives the command engine speed and the engine speed and outputs the command dynamo torque. In this engine testing system of the eighth embodiment, various engine characteristics are measured by detecting the axial torque.

Figure 11:
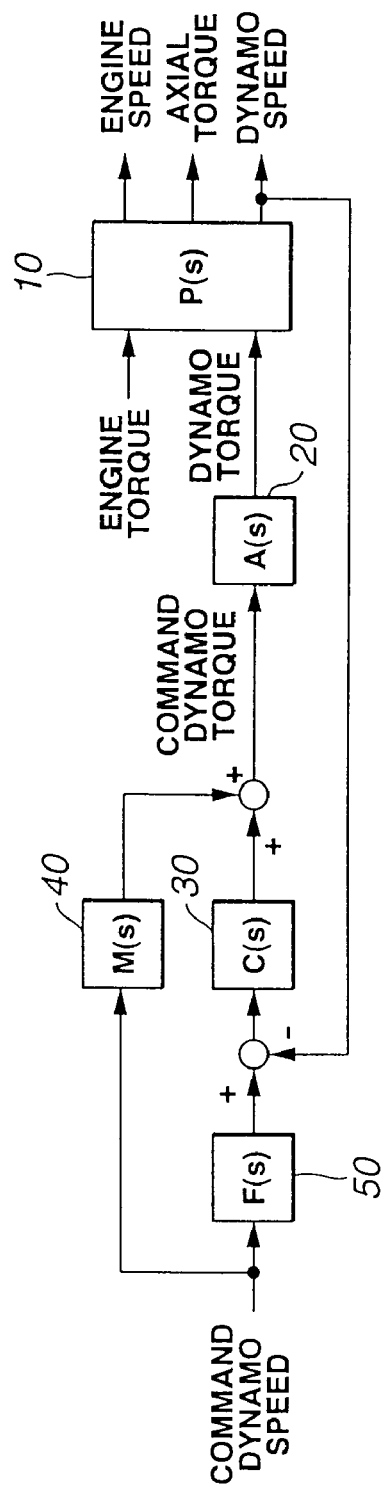
FIG. 11 is a block diagram showing a ninth embodiment of the system and method according to the present invention.

FIG. 11 shows a ninth embodiment of the engine testing system and the method employed in this system according to the present invention.

In this ninth embodiment, the µ-synthesis method is employed to derive a feedback speed controller 30 represented by a transfer function C(s) in a model matching speed control system for controlling the dynamo speed by detecting the dynamo speed. In FIG. 11, a block 50 is provided at a plus input of a subtractor which is provided at an input side of the feedback speed controller 30, and functions as a command value filter F(s) for deforming a command response waveform into a desired waveform. Further, a block 40 is provided so as to connect an input side of the block 50 and an adder provided at an input side of the inverter 20. The block 40 is a mechanical system command value filter M(s) for deforming a command response waveform into a desired waveform. The transfer function C(s) of the feedback speed controller 30 in this ninth embodiment is derived using the µ-synthesis method wherein a disturbance input, a controlled variable and an uncertainty are appropriately employed as is basically similar to the first embodiment. In this engine testing system according to the ninth embodiment, various engine characteristics are measured by detecting the axial torque.

Figure 12:
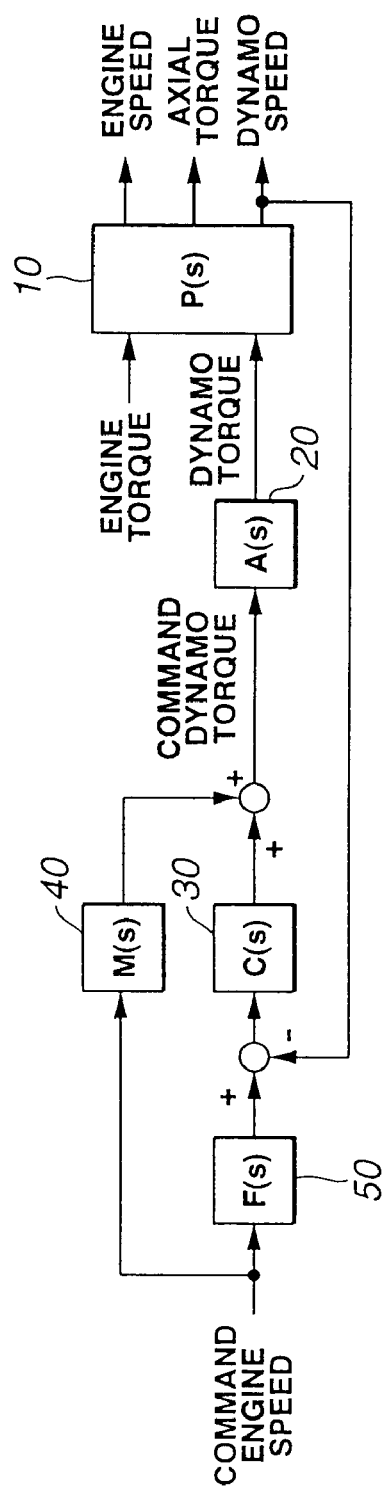
FIG. 12 is a block diagram showing a tenth embodiment of the system and method according to the present invention.

FIG. 12 shows a tenth embodiment of the engine testing system and the method employed in this system according to the present invention.

In this tenth embodiment, the µ-synthesis method is employed to derive a feedback speed controller 30 represented by a transfer function C(s) in a model matching speed control system for controlling the engine speed by detecting the dynamo speed. In FIG. 12, a block 50 is provided at a plus input of a subtractor provided at an input side of the feedback speed controller 30 and functions as a command value filter F(s) for deforming a command response waveform into a desired waveform. Further, a block 40 is provided so as to connect an input side of the block 50 and an adder provided at an input side of the inverter 20. The block 40 is a mechanical system command value filter M(s) for deforming a command response waveform into a desired waveform. The transfer function C(s) of the feedback speed controller 30 in this tenth embodiment is derived using the $\mu$-synthesis method wherein a disturbance input, a controlled variable and an uncertainty are appropriately employed as is basically similar to the first embodiment. In this engine testing system according to the tenth embodiment, various engine characteristics are measured by detecting the axial torque.

Figure 13:
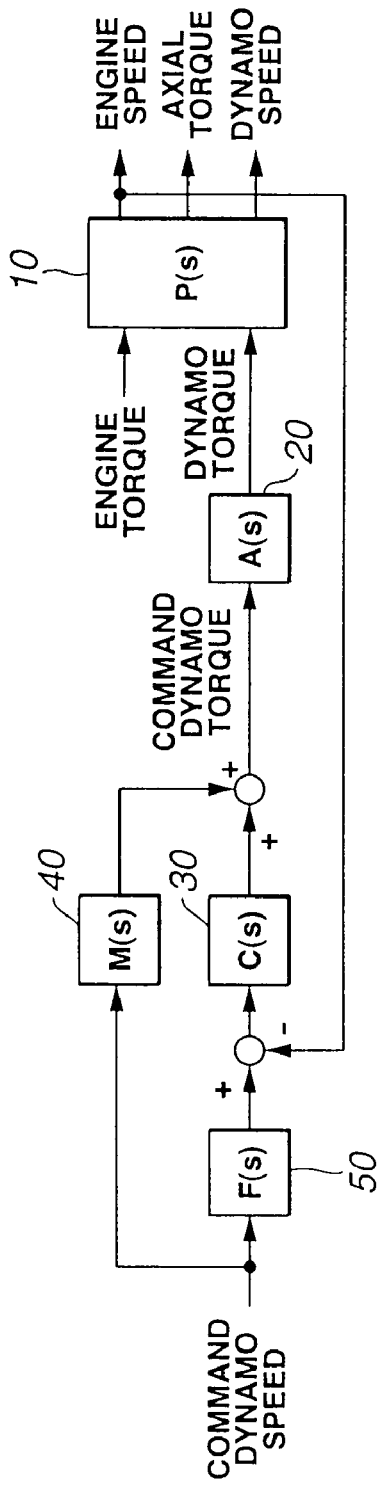
FIG. 13 is a block diagram showing an eleventh embodiment of the system and method according to the present invention.

FIG. 13 shows an eleventh embodiment of the engine testing system and the method employed in this system according to the present invention.

In this eleventh embodiment, the $\mu$-synthesis method is employed to derive a feedback speed controller 30 represented by a transfer function C(s) in a model matching speed control system for controlling the dynamo speed by detecting the engine speed. In FIG. 13, a block 50 is provided at a plus input of a subtractor which is provided at an input side of the feedback speed controller 30. The block 50 is represented by a command value filter F(s) for deforming a command response waveform into a desired waveform. Further, a block 40 is provided so as to connect an input side of the block 50 and an adder provided at an input side of the inverter 20. The block 40 is a mechanical system command value filter M(s) for deforming a command response waveform into a desired waveform. The transfer function C(s) of the feedback speed controller 30 in this eleventh embodiment is derived using the $\mu$-synthesis method wherein a disturbance input, a controlled variable and an uncertainty are appropriately employed as is basically similar to the first embodiment. In this engine testing system according to the eleventh embodiment, various engine characteristics are measured by detecting the axial torque.

Figure 14:
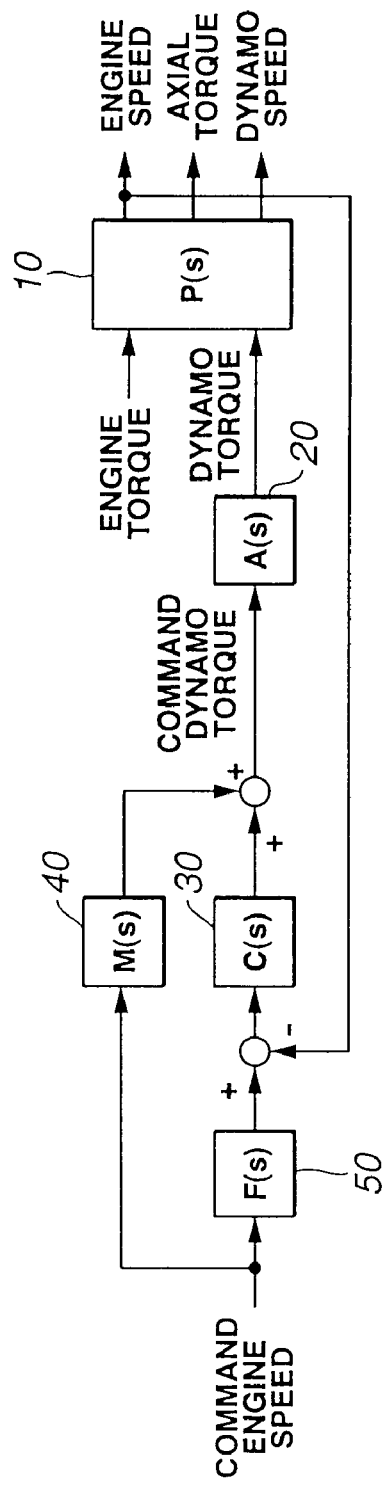
FIG. 14 is a block diagram showing a twelfth embodiment of the system and method according to the present invention.

FIG. 14 shows a twelfth embodiment of the engine testing system and the method employed in this system according to the present invention.

In this twelfth embodiment, the $\mu$-synthesis method is employed to derive a feedback speed controller 30 represented by a transfer function C(s) in a model matching speed control system for controlling the engine speed by detecting the engine speed. In FIG. 14, a block 50 is provided at a plus input of a subtractor provided at an input side of the feedback speed controller 30 and functions as a command value filter F(s) for deforming a command response waveform into a desired waveform. Further, a block 40 is provided so as to connect an input side of the block 50 and an adder provided at an input side of the inverter 20. The block 40 is a mechanical system command value filter M(s) for deforming a command response waveform into a desired waveform. The transfer function C(s) of the feedback speed controller 30 in this twelfth embodiment is derived using the $\mu$-synthesis method wherein a disturbance input, a controlled variable and an uncertainty are appropriately employed as is basically similar to the first embodiment. In this engine testing system according to the twelfth embodiment, various engine characteristics are measured by detecting the axial torque.

Figure 15:
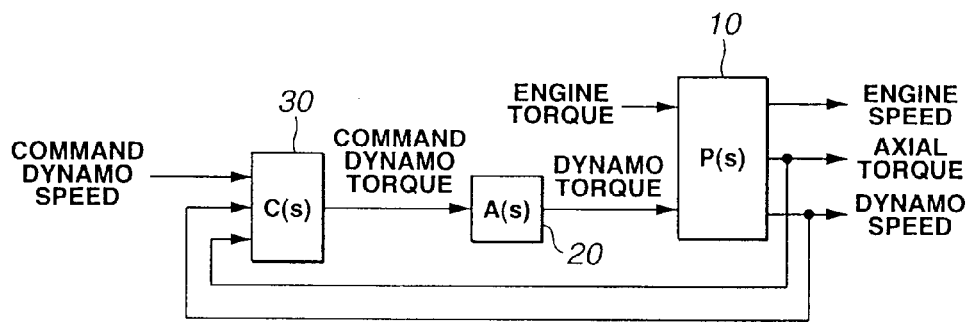
FIG. 15 is a block diagram showing a thirteenth embodiment of the system and method according to the present invention.

FIG. 15 shows a thirteenth embodiment of the engine testing system and the method employed in this system according to the present invention.

In this thirteenth embodiment, the $\mu$-synthesis method is employed to derive a feedback controller 30 represented by a transfer function C(s) in a speed control system for controlling the dynamo speed by detecting the dynamo speed and the axial torque. The transfer function C(s) of the feedback speed controller 30 in this thirteenth embodiment is derived using the $\mu$-synthesis method wherein a disturbance input, a controlled variable and an uncertainty are appropriately employed as is basically similar to the first embodiment. The speed controller 30 receives the command dynamo speed, the dynamo speed, and the axial torque and outputs the command dynamo torque. In this engine testing system according to the thirteenth embodiment, various engine characteristics are measured by detecting the axial torque.

Figure 16:
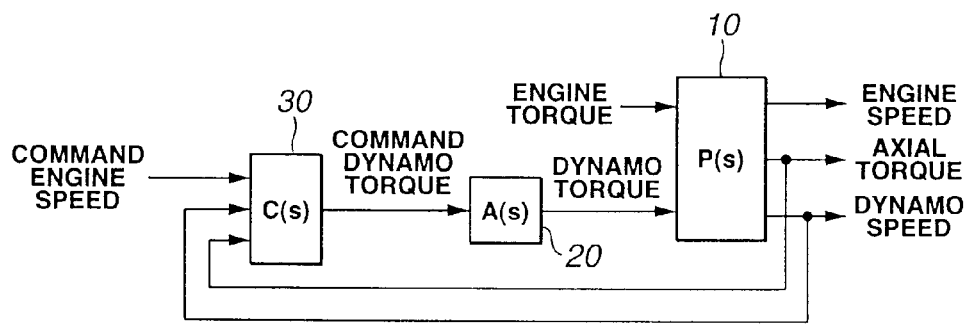
FIG. 16 is a block diagram showing a fourteenth embodiment of the system and method according to the present invention.

FIG. 16 shows a fourteenth embodiment of the engine testing system and the method employed in this system according to the present invention.

In this fourteenth embodiment, the $\mu$-synthesis method is employed to derive a feedback speed controller 30 represented by a transfer function C(s) in a speed control system for controlling the engine speed by detecting the dynamo speed and the axial torque. The transfer function C(s) of the feedback speed controller 30 in this fourteenth embodiment is derived using the $\mu$-synthesis method wherein a disturbance input, a controlled variable and an uncertainty are appropriately employed as is basically similar to the first embodiment. The speed controller 30 receives the command engine speed, the dynamo speed, and the axial torque and outputs the command dynamo torque. In this engine testing system according to the fourteenth embodiment, various engine characteristics are measured by detecting the axial torque.

Figure 17:
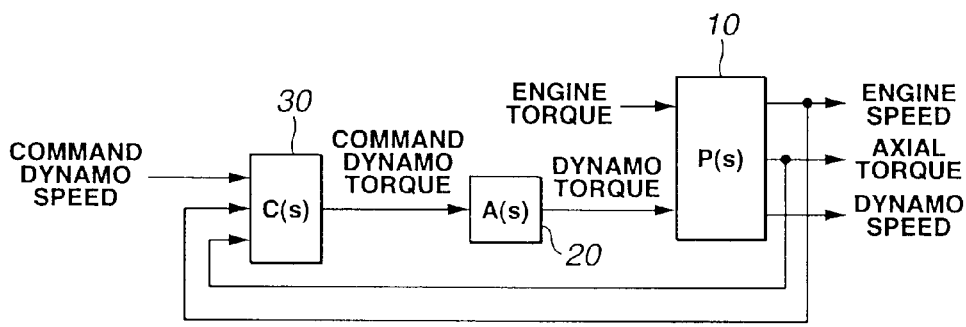
FIG. 17 is a block diagram showing a fifteenth embodiment of the system and method according to the present invention.

FIG. 17 shows a fifteenth embodiment of the engine testing system and the method employed in this system according to the present invention.

In this fifteenth embodiment, the $\mu$-synthesis method is employed to derive a feedback speed controller 30 represented by a transfer function C(s) in a speed control system for controlling the dynamo speed by detecting the engine speed and the axial torque. The transfer function C(s) of the feedback speed controller 30 in this fifteenth embodiment is derived using the $\mu$-synthesis method wherein a disturbance input, a controlled variable and an uncertainty are appropriately employed as is basically similar to the first embodiment. The speed controller 30 receives the command dynamo speed, the engine speed, and the axial torque and outputs the command dynamo torque. In this engine testing system of the fifteenth embodiment, various engine characteristics are measured by detecting the axial torque.

Figure 18:
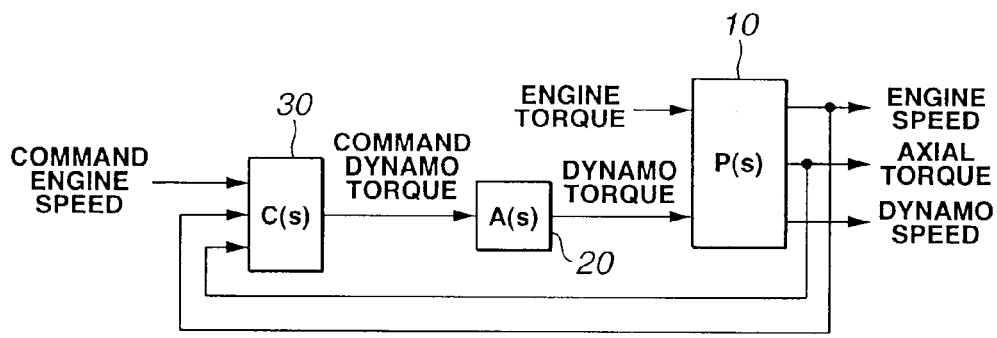
FIG. 18 is a block diagram showing a sixteenth embodiment of the system and method according to the present invention.

FIG. 18 shows a sixteenth embodiment of the engine testing system and the method employed in this system according to the present invention.

In this sixteenth embodiment, the $\mu$-synthesis method is employed to derive a feedback speed controller 30 represented by a transfer function C(s) in a speed control system for controlling the dynamo speed by detecting the engine speed and the axial torque. The transfer function C(s) of the feedback speed controller 30 in this sixteenth embodiment is derived using the $\mu$-synthesis method wherein a disturbance input, a controlled variable and an uncertainty are appropriately employed as is basically similar to the first embodiment. The speed controller 30 receives the command engine speed, the engine speed, and the axial torque and outputs the command dynamo torque. In this engine testing system, various engine characteristics are measured by detecting the axial torque.

Figure 19:
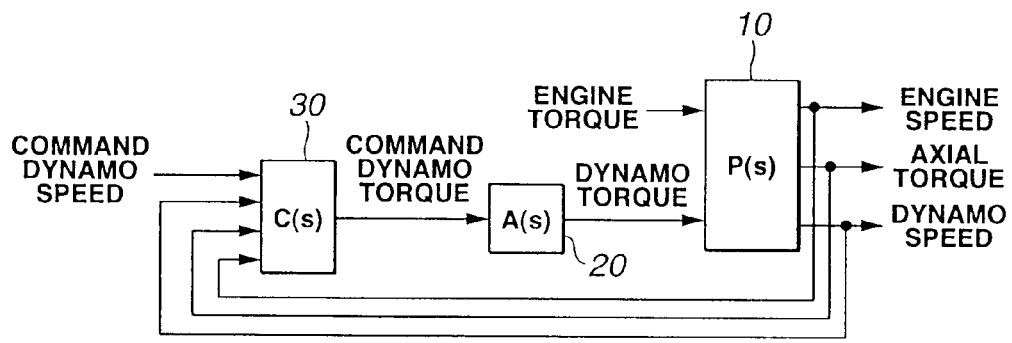
FIG. 19 is a block diagram showing a seventeenth embodiment of the system and method according to the present invention.

FIG. 19 shows a seventeenth embodiment of the engine testing system and the method employed in this system according to the present invention.

In this seventeenth embodiment, the μ-synthesis method is employed to derive a feedback speed controller 30 represented by a transfer function C(s) in a speed control system for controlling the dynamo speed by detecting the engine speed, the axial torque and the dynamo speed. The transfer function C(s) of the feedback speed controller 30 in this seventeenth embodiment is derived using the μ-synthesis method wherein a disturbance input, a controlled variable and an uncertainty are appropriately employed as is basically similar to the first embodiment. The speed controller 30 receives the command dynamo speed, the engine speed, the dynamo speed, and the axial torque and outputs the command dynamo torque. In this engine testing system, various engine characteristics are measured by detecting the axial torque.

Figure 20:
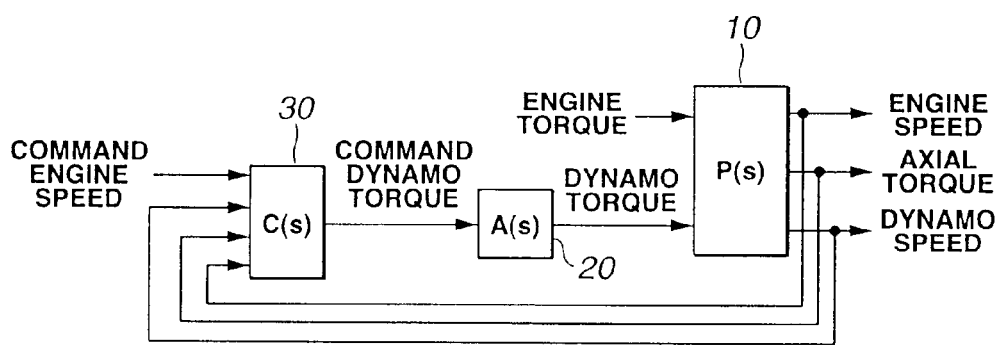
FIG. 20 is a block diagram showing an eighteenth embodiment of the system and method according to the present invention.

FIG. 20 shows an eighteenth embodiment of the engine testing system and the method employed in this system according to the present invention.

In this eighteenth embodiment, the μ-synthesis method is employed to derive a feedback speed controller 30 represented by a transfer function C(s) in a speed control system for controlling the engine speed by detecting the engine speed, the axial torque and the dynamo speed. The transfer function C(s) of the feedback speed controller 30 in this eighteenth embodiment is derived using the μ-synthesis method wherein a disturbance input, a controlled variable and an uncertainty are appropriately employed as is basically similar to the first embodiment. The speed controller 30 receives the command engine speed, the engine speed, the dynamo speed, and the axial torque and outputs the command dynamo torque. In this engine testing system, various engine characteristics are measured by detecting the axial torque.

With the thus arranged embodiments according to the present invention, the speed and the torque of the dynamometer is controlled by means of the speed controller 30 represented by the transfer function C(s). Therefore, it becomes possible to stably execute a measurement of various characteristics of the engine 1 in a high-speed operating condition.

This application is based on Japanese Patent Applications No. 2001-313395 filed on Oct. 11, 2001 in Japan. The entire contents of this Japanese Patent Application are incorporated herein by reference.

Although the invention has been described above by reference to certain embodiments of the invention, the invention is not limited to the embodiments described above. Modifications and variations of the embodiments described above will occur to those skilled in the art, in light of the above teaching.

The scope of the invention is defined with reference to the following claims.

What is claimed is:

1. A system for measuring characteristics of an engine, the system being constructed by connecting the engine with a dynamometer functioning as a driving force receiving member by means of a shaft, the system comprising:
   a speed control system which controls at least one of an engine speed and a dynamo speed, the speed control system comprising,
      a first block represented by a mechanical transfer function, the first block receiving an engine torque and a dynamo torque and outputting the engine speed, an axial torque and the dynamo speed,
      a second block represented by an electric transfer function, the second block receiving a command dynamo torque and outputting the dynamo torque, and
      a speed controller receiving one of a command engine speed and a command dynamo speed, and at least one of the engine speed and the dynamo speed, and outputting the command dynamo torque, the speed controller being represented by a transfer function designed using the structured singular value synthesis method so as to be adapted to the mechanical transfer function and the electric transfer function.

2. The system as claimed in claim 1, wherein the transfer function of the speed controller is designed so as to achieve the robust stability and the robust performance of the speed control system.

3. The system as claimed in claim 1, wherein a disturbance input employed in the structured singular value synthesis method includes at least one of the engine torque, a signal added to the engine speed, a signal added to the dynamo torque, a signal added to the command dynamo torque, a signal added to the engine speed, a signal added to the dynamo speed, the command engine speed and the command dynamo speed.

4. The system as claimed in claim 1, wherein a controlled variable employed in the structured singular value synthesis method includes at least one of a difference between the command vehicle speed and the detected vehicle speed, a command dynamo torque, a dynamo torque and an axial torque.

5. The system as claimed in claim 3, wherein a difference between a rotation angle of the dynamometer and a rotation angle of the engine is employed as the axial torque.

6. The system as claimed in claim 1, wherein when an inertia moment of a member except for the engine and the dynamometer is generated in the speed control system, the inertia moment of the member is employed as a controlled variable in the structured singular value synthesis method.

7. The system as claimed in claim 1, wherein an uncertainty term employed in the structured singular value synthesis method includes at least one of the engine inertia moment, an axial spring constant of the shaft, and the dynamo inertia moment.

8. The system as claimed in claim 7, wherein the uncertainty term employed in the structured singular value synthesis method further includes at least one of an inertia moment of a member except for the engine and the dynamometer and an axial spring constant of a member except for the shaft.

9. A method for measuring characteristics of an engine using a speed control system for controlling at least one of an engine speed and a dynamo speed in a system of the engine, the dynamometer, and the shaft, the method comprising the steps of:
   receiving an engine torque and a dynamo torque and outputting the engine speed, an axial torque and the dynamo speed in response to the engine torque and the dynamo torque;
   receiving a command dynamo torque and outputting the dynamo torque in response to the command dynamo toque; and
   receiving one of a command engine speed and a command dynamo speed, and at least one of the engine speed and the dynamo speed, and outputting the command dynamo torque in response to the received signals by means of a speed controller which is represented by a transfer function designed using the structured singular value synthesis method so as to be adapted to the mechanical transfer function and the electric transfer function.

10. The method as claimed in claim 9, wherein the transfer function of the speed controller is designed so as to achieve the robust stability and the robust performance of the speed control system.

11. The method as claimed in claim 9, wherein a disturbance input employed in the structured singular value synthesis method includes at least one of the engine torque, a signal added to the dynamo torque, a signal added to the dynamo torque, a signal to be added to the dynamo torque, and a signal to be added to the command dynamo torque, a signal to be added to the dynamo torque and the command engine speed.

12. The method as claimed in claim 9, wherein a controlled variable employed in the structured singular value synthesis method includes at least one of a difference between the command vehicle speed and the detected vehicle speed, a command dynamo torque, a dynamo torque and an axial torque.

13. The method as claimed in claim 11, wherein a difference between a rotation angle of the dynamometer and a rotation angle of the engine is employed as the axial torque.

14. The method as claimed in claim 9, wherein when an inertia moment of a member except for the engine and the dynamometer is generated in the speed control system, the inertia moment of the member is employed as a controlled variable in the structured singular value synthesis method.

15. The method as claimed in claim 9, wherein an uncertainty term employed in the structured singular value synthesis method includes at least one of the engine inertia moment, an axial spring constant of the shaft, and the dynamo inertia moment.

16. The method as claimed in claim 15, wherein an uncertainty term employed in the structured singular value synthesis method further includes at least one of an inertia moment of a member except for the engine and the dynamometer and an axial spring constant of a member except for the shaft.

* * * * *